United States Patent [19]
Newlin et al.

[11] Patent Number: 5,877,821
[45] Date of Patent: Mar. 2, 1999

[54] MULTIMEDIA INPUT AND CONTROL APPARATUS AND METHOD FOR MULTIMEDIA COMMUNICATIONS

[75] Inventors: Douglas J. Newlin, Geneva; Timothy M. Burke, Algonquin, both of Ill.

[73] Assignee: Motorola, Inc., Schaumburg, Ill.

[21] Appl. No.: 791,123

[22] Filed: Jan. 30, 1997

[51] Int. Cl.$^6$ .................................................. H04N 5/40
[52] U.S. Cl. ............................ 348/724; 348/15; 348/469
[58] Field of Search ..................................... 348/724, 705, 348/723, 469, 473, 22, 15, 17, 722

[56] References Cited

U.S. PATENT DOCUMENTS

| | | | |
|---|---|---|---|
| 4,953,196 | 8/1990 | Ishikawa | 348/22 |
| 5,038,404 | 8/1991 | Marz | 348/724 |
| 5,047,860 | 9/1991 | Rogalski | 348/724 |
| 5,172,231 | 12/1992 | Jarick et al. | 348/724 |
| 5,585,858 | 12/1996 | Harper et al. | 348/473 |

*Primary Examiner*—Victor R. Kostak
*Attorney, Agent, or Firm*—Terri S. Hughes

[57] ABSTRACT

An apparatus (300, 400) and method are provided for multimedia communications, such as for video conferencing. One of the embodiments of the apparatus for multimedia input and control (300) includes a video input (310) to produce an input video signal; an audio input (320) to produce an input audio signal; a radio frequency modulator (350); a data/control input (330) to produce an input data signal; and a processor arrangement (360) responsive when operably coupled, through a set of program instructions, to produce a first processor signal to the radio frequency modulator to combine the input video signal with the input audio signal to form a composite audio/video signal, and the processor arrangement (360) further responsive to modulate the input data signal to form a modulated input data signal and produce a second processor signal to the radio frequency modulator to combine the input video signal with the modulated input data signal to form a combined video/data signal.

39 Claims, 4 Drawing Sheets

MULTIMEDIA INPUT AND CONTROL APPARATUS AND METHOD FOR MULTIMEDIA COMMUNICATIONS

CROSS-REFERENCE TO RELATED APPLICATIONS

This application is related to the following United States patent applications, each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", Motorola Docket No. PD05634AM (the "first related application");

Burke et al., U.S. patent application Ser. No. 08/706,100, filed Aug. 30, 1996, entitled "Apparatus, Method And System For Audio And Video Conferencing And Telephony", Motorola Docket No. PD05686AM (the "second related application");

Burke et al., U.S. patent application Ser. No. 08/715,887, filed Sep. 18, 1996, entitled "Videophone Apparatus, Method And System For Audio And Video Conferencing And Telephony", Motorola Docket No. PD05689AM (the "third related application");

Newlin et al., U.S. patent application Ser. No. 08/672,819, filed Jun. 28, 1996, entitled "ISDN Communication System and Method Thereof", Motorola Docket No. PD05677AM (the "fourth related application");

Burke et al., U.S. patent application Ser. No. 08/725,602, filed Oct. 3, 1996, entitled "Apparatus, Method And System For Wireline Audio And Video Conferencing And Telephony", Motorola Docket No. PD05703AM (the "fifth related application"); and Burke et al., U.S. patent application Ser. No. 08/726,329, filed Oct. 3, 1996, entitled "Videophone Apparatus, Method And System For Wireline Audio And Video Conferencing And Telephony", Motorola Docket No. PD05725AM (the "sixth related application");

Newlin et al., U.S. patent application Ser. No. 08/735,295, filed Oct. 22, 1996, entitled "Apparatus, Method And System For Multimedia Control And Communication", Motorola Docket No. PD05688AM (the "seventh related application");

Burke et al., U.S. patent application Ser. No. 08/757,184, filed Nov. 27, 1996, entitled "Apparatus, Method And System For Wireless Audio And Video Conferencing And Telephony", Motorola Docket No. PD05709AM (the "eighth related application");

Newlin, U.S. patent application Ser. No. 08/163,159, filed Dec. 10, 1996, entitled "Apparatus, Method And System For Wireline Audio And Video Conferencing And Telephony, With Network Interactivity", Motorola Docket No. PD05752AM (the "ninth related application"); and Newlin et al., U.S. patent application Ser. No. 08/779,083, filed Jan. 6, 1997, entitled "Apparatus And Method For Multimedia Communications With Multiple Network Functionality", Motorola Docket No. PD05730AM (the "tenth related application").

FIELD OF THE INVENTION

This invention relates in general to audio, video and multimedia communications systems and, more specifically, to a multimedia input and control apparatus and method for multimedia communications.

BACKGROUND OF THE INVENTION

The various related applications disclose apparatuses, methods and systems for multimedia communications, such as video conferencing and telephony, over a variety of communications channels, such as wireline, cable, and hybrid fiber coaxial cable, and utilizing a variety of communications networks, such as an Integrated Services Digital Network ("ISDN"), the Public Switched Telephone Network ("PSTN"), and cable networks.

For video conferencing and other video capability, the various systems illustrated in the related applications require video camera input capability, to generate a video image for use in video conferencing or other activities, such as in-home or premise surveillance. In addition, as disclosed in the related applications, preferably under user control, various video images from a plurality of sources may also be multiplexed to create a composite image, or may be individually selected for transmission. Preferably, such a video apparatus should also provide for other means of user input, such as input of images for multimedia faxing. Accordingly, a need has remained for a multimedia input and control apparatus and method which may be utilized for multimedia communications, including video conferencing, faxing, data and other communications. In addition, such a multimedia input and control apparatus and method should also provide user control functionality and multimedia functionality for a plurality of applications.

DETAILED DESCRIPTION OF THE INVENTION

As mentioned above, a need has remained for a multimedia input and control apparatus and method which may be utilized for multimedia communications, including video conferencing, faxing, data and other communications. In addition, such a multimedia input and control apparatus and method should also provide user control functionality. As discussed in greater detail below, the multimedia input and control apparatus and method of the present invention provides such capability for multimedia communications, including video conferencing, faxing, data and other communications, and also provide user control functionality.

Figure 1:
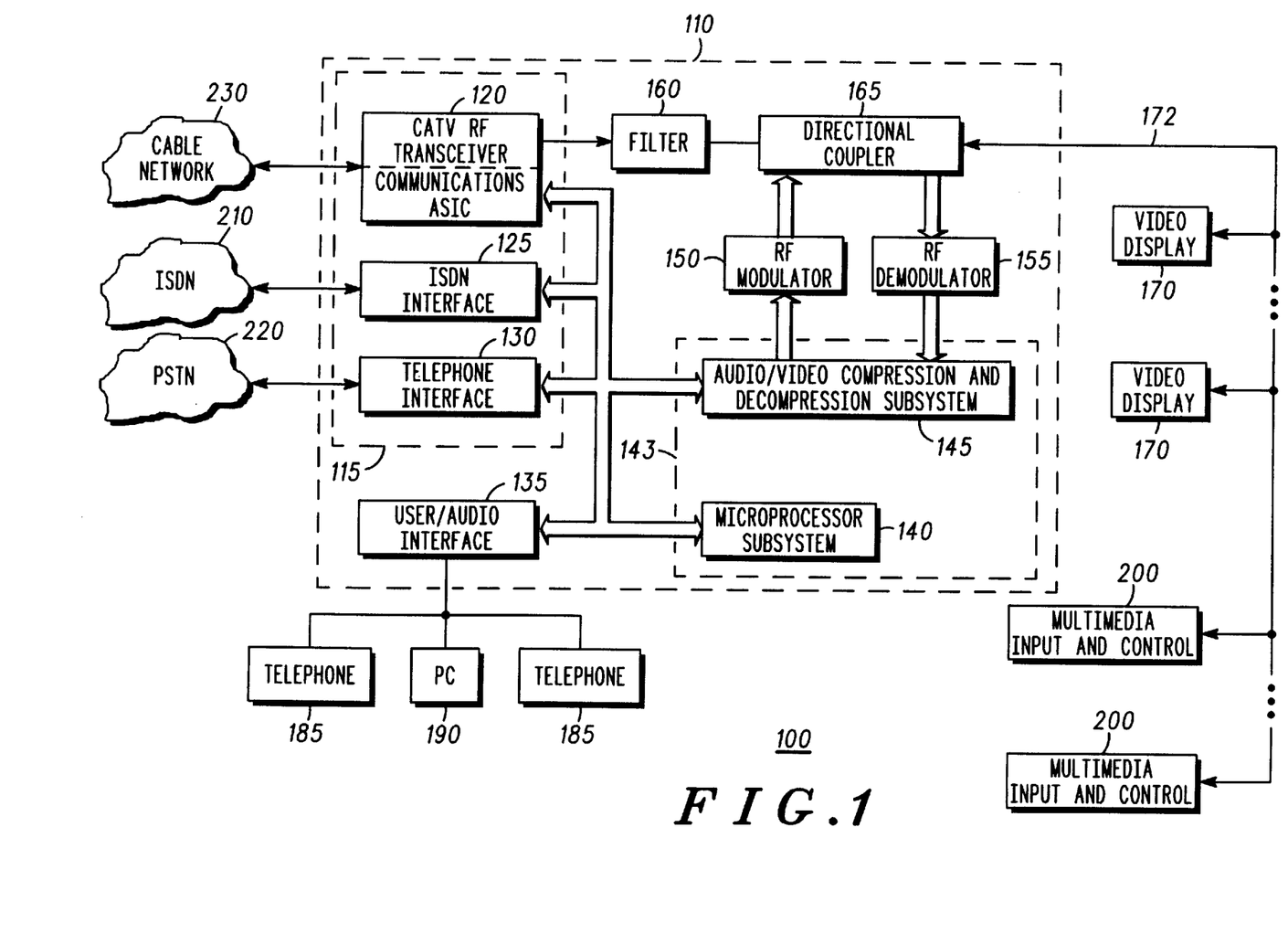
FIG. 1 is a block diagram illustrating a multimedia access apparatus and system, and a video camera apparatus, for multimedia communications in accordance with the present invention.

FIG. 1 is a block diagram illustrating a multimedia (or video) access apparatus 110 and system 100, and a multimedia input and control apparatus 200, for multimedia communications in accordance with the present invention. The various components comprising multimedia (or video) access apparatus 110 have been disclosed and discussed in detail in the related applications, and in the interests of brevity, is not elaborated upon herein. As illustrated in FIG. 1, the multimedia access apparatus 110 is coupled or connected to one or more networks; a first network such as cable network 230, a second network such as ISDN 210, and a third network such as PSTN 220. The multimedia access apparatus 110 is connected to these networks 230, 210 and 220 through one or more corresponding network interfaces 115, namely, cable network (CATV) radio frequency (RF) transceiver (with communications ASIC) 120, ISDN interface 125, and telephony (PSTN or POTS (plain old telephone system)) interface 130. The network interfaces 115 are connected to a processor arrangement 143, which in the preferred embodiment is comprised of a microprocessor subsystem 140 and an audio/video compression and decompression subsystem 145.

Continuing to refer to FIG. 1, the processor arrangement 143 is connected to a first RF modulator 150 and an RF demodulator 155 which are utilized, respectively, to transmit and receive video or other multimedia signals on communications channel (or line) 172 (via directional coupler 165), such as for video conferencing. The communications channel 172 is typically located within or about the user (or subscriber) premises, and for example, may be an internal 75 Ohm coaxial cable typically utilized with cable television. Video and other multimedia signals are typically transmitted through the various networks as compressed signals, and corresponding compression and decompression occurs in the audio/video compression and decompression subsystem 145 utilizing protocols such as, for example, H.320 for ISDN or H.324 for PSTN video calls. Received video or other multimedia signals (transmitted from a far end or remote party) are decompressed in the audio/video compression and decompression subsystem 145, modulated onto an available RF carrier or channel (in first RF modulator 150), transmitted on communications channel 172, and displayed on any of the video displays 170, such as connected televisions. Video or other multimedia signals to be transmitted (from the near end (local party) and sent to the far end (remote party)) are generated and modulated onto an RF carrier by the multimedia input and control apparatus 200, demodulated (in RF demodulator 155), and compressed in the audio/video compression and decompression subsystem 145. The microprocessor subsystem 140 and the various interfaces 115 then process and format the video or other multimedia signal for transmission to one of the networks 230, 210 or 220. Video signals from a cable network 230, such as cable television, pass through filter 160 and directional coupler 165, and also may be viewed on the various video displays 170. The processor arrangement 143 is also connected to a user interface such as user/audio interface 135, which provides for audio input and output (via telephones 185), and also provides for the reception or entry of a plurality of control signals, discussed in greater detail below, which may include control signals input from a telephone 185, such as off hook, on hook, flash, various DTMF tones, or other programmed or programmable control signals, such as control signals input from a personal computer (PC) 190.

Figure 2:
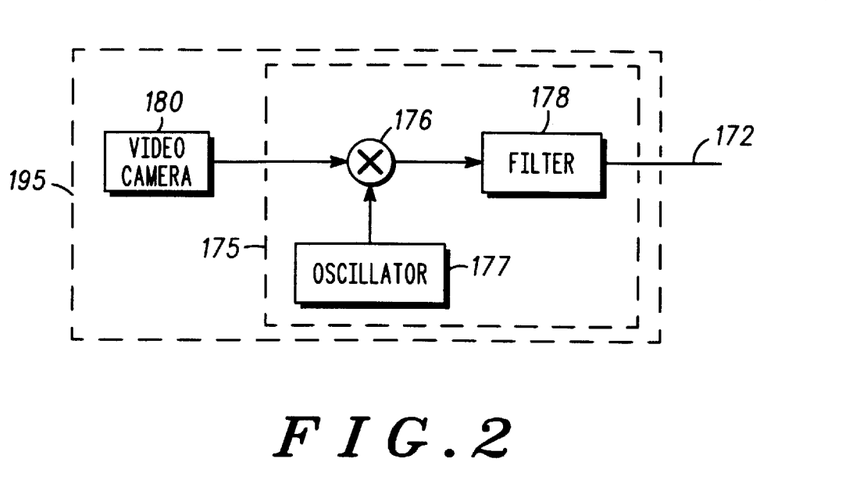
FIG. 2 is a block diagram illustrating a first embodiment of a multimedia input and control apparatus as a video input device 195.

The multimedia input and control apparatus 200, as disclosed in the related applications, may have a first embodiment as a video input device 195, as illustrated in FIG. 2, consisting of a video camera 180 with a camera interface 175 (discussed below), utilized to generate the outgoing video portion of an audio and video conferencing call or session (outgoing in the sense of being transmitted from the multimedia access apparatus 110 to another location), and may also include a microphone for generation of the outgoing audio portion of an audio and video conferencing call or session. As disclosed in the related applications, the camera interface 175 is utilized to modulate the video output signal from the video camera 180 for transmission on the communications channel 172 to the multimedia access apparatus 110. More specifically, the video signal originating in the user premises and to be transmitted via the multimedia access apparatus 110 and one of the networks 230, 210 or 220, to another, second user premises (or other location), originates from a video camera 180 that produces a video signal, such as an NTSC/PAL composite video signal, which is also preferably modulated at a first frequency, such as on channel 3 or 4 (61.25 or 67.25 MHz). This RF video signal from the video camera 180 is connected or coupled to a camera interface 175, which utilizes an offset mixer to shift the RF video signal (typically on a 61.25 or 67.25 MHz carrier) to a second frequency, namely, up to a spectrum higher than typical CATV frequencies, such as the 1.2 GHz or 900 MHz bands, without demodulation and modulation of the video signal. As illustrated in FIG. 2, the input video signal from the video camera 180 is mixed up to the required output frequency (RF) using an offset mixer 176, a fixed reference oscillator 177, and a bandpass filter 178. The shifted video signal from the camera interface 175, referred to as a radio frequency input video signal, is then injected into the same communications channel 172 (also connected to the video displays 170) which transmits the radio frequency input video signal to the multimedia access apparatus 110. The multimedia access apparatus 110 receives the radio frequency input video signal from the directional coupler 165 (at 1.2 GHz or 900 MHz) and demodulates the signal to baseband using RF demodulator 155, to form a baseband input video signal. The baseband input video signal is then converted to digital form, compressed and modulated for transmission over one of the networks 230, 210 or 220. In the preferred embodiment, by using a vacant video channel at 1.2 GHz or 900 MHz, for example, interference with the downstream and upstream CATV services tends to be avoided. The 1.2 GHz or 900 MHz signal is also filtered out of the feedthrough cable by a low pass filter 160, so that the signal is highly attenuated before it may leave the multimedia access apparatus 110.

While the primary function of the multimedia access apparatus 110 and system 100 is to provide full-duplex video communications, other secondary functions are also available in the preferred embodiment. For example, one such secondary function is a "loop back function" which allows the user to view the video from the multimedia input and control apparatus 200 on the screen of a video display 170 (such as a television), such that the RF input video signal is demodulated (from 1.2 GHz or 900 MHz), remodulated onto a video RF carrier, and utilized for an RF output video signal to the video displays 170. Such a loop back feature is especially valuable for surveillance, such as for home security or for baby monitoring. Also, a picture-in-picture (or multiple window) function may be provided, in which a user may view a small window of the video from multimedia input and control apparatus 200 along with the received video from another location, for example, to provide baby monitoring within the small window while simultaneously watching a movie or video received from a CATV network.

Figure 3:
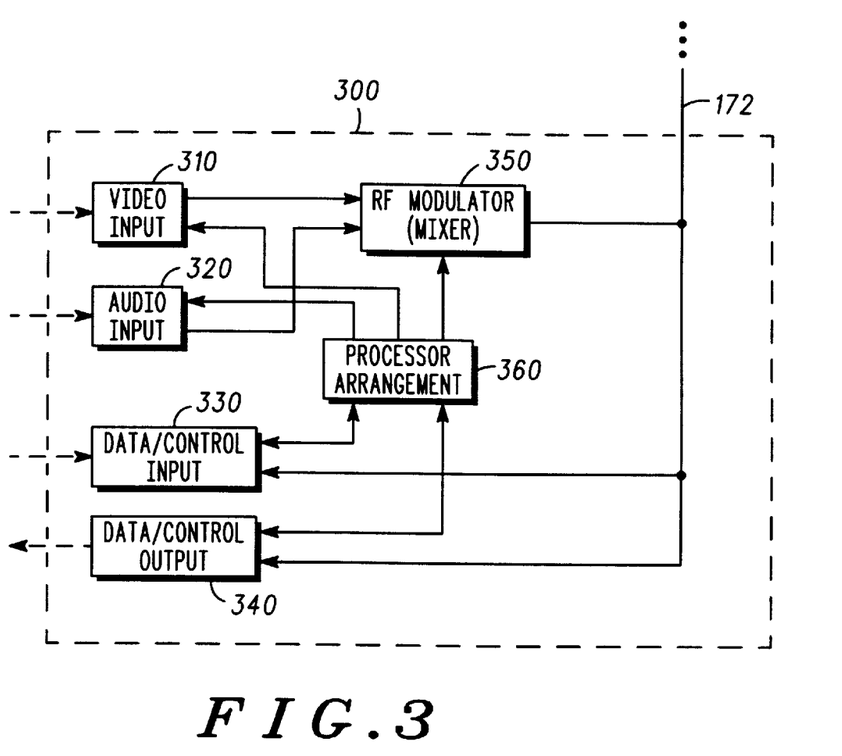
FIG. 3 is a block diagram illustrating a second and preferred embodiment of a multimedia input and control apparatus 300.

FIG. 3 is a block diagram illustrating a second and preferred embodiment of a multimedia input and control apparatus 300. In addition to providing video (and audio) input, the multimedia input and control apparatus 300 also provides control functionality and provides other forms of multimedia input and output. For example, as described in greater detail below, the multimedia input and control apparatus 300 may receive user commands via the multimedia access apparatus 110 and communications channel 172, and also may receive user commands and other multimedia input via data/control input 330. Also as described in greater detail below, the control functionality provided by the multimedia input and control apparatus 300 includes frequency control, power level control, audio/video output control, audio/video input selection, multiplexing control, and control for a myriad of other telephony, communications, and multimedia applications and functions. In addition, the control functionality provided by the multimedia input and control apparatus 300 (and also 400) enables distributed input/output (I/O) functionality, such as I/O functionality distributed throughout a user's premises (via communication channel 172).

Referring to FIG. 3, the multimedia input and control apparatus 300 includes video input 310 (such as a video camera) to produce an input video signal; audio input 320 (such as a microphone) to produce an input audio signal; data/control input 330, which may be wireline, wireless, infrared (IR) or optical, to provide input of data, control signals, and other multimedia input, such as keyboard input or wireless IR input; and data/control output 340, which also may be wireline, wireless, IR or optical, to provide output of data, control signals, and other multimedia output, such as wireless IR output. In addition, depending upon the desired implementation, the multimedia input and control apparatus 300 may include multiple data/control inputs and outputs (or input/output (I/O) ports), such as having both IR data/control inputs and outputs and RF wireless data/control inputs and outputs. The input video signal from the video input 310 and the input audio signal from the audio input 320 are modulated (or offset mixed) onto an RF carrier in RF modulator (or mixer) 350, for transmission on communications channel 172, as discussed above. As discussed in greater detail below, in the preferred embodiment, the multimedia input and control apparatus 300 is frequency agile, with a plurality of RF carriers available for transmission of the input video/audio signal, under user control. In addition, video input 310, audio input 320, data/control input 330, data/control output 340, and RF modulator 350, are coupled to a processor arrangement 360 which, as explained in the related applications and in greater detail below, may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor or controller, or arrangement of processors, microprocessors, controllers, or some other grouping of integrated circuits which perform the functions discussed in greater detail below. In addition, as discussed in greater detail below, the methodology of the invention, and other control and command operations, may be programmed and stored, as a set of program instructions for subsequent execution, in the processor arrangement 360 (or microcontroller 425, as part of processor arrangement 485) and its (or their) associated memory and other equivalent components. Accordingly, when the processor arrangement 360 is operably coupled, i.e., the multimedia input and control apparatus 300 is powered on and preferably coupled to the communication channel 172, the processor arrangement is responsive through the set of program instructions to perform the various functions discussed in greater detail below.

Continuing to refer to FIG. 3, the processor arrangement 360 is utilized for the reception of control or command signals from the data/control input 330 and to or from the multimedia access apparatus 110, and is utilized to control and configure the video input 310, audio input 320, data/control input 330, data/control output 340, and RF modulator 350, and to interpret any information received from these components and perform corresponding functions. For example, the processor arrangement 360 may receive FSK (frequency shift keying) data from multimedia access apparatus 110, which may include various commands or control signals, such as to zoom, pan, or tilt the video input 310. Similarly, when the processor arrangement 360 may receive a multiplexing command (from the multimedia access apparatus 110 or the data/control input 330), it may then direct the RF modulator 350 to modulate the audio and video signals at a particular RF carrier frequency and to adjust the transmit power level (both to avoid interference with the other audio/video signals on communications channel 172 which are to be multiplexed subsequently by the multimedia access apparatus 110, and to move to frequencies or channels having less noise, less interference, and overall higher quality). In addition, the processor arrangement 360 may receive a transmit or receive faxing command (from the multimedia access apparatus 110 or the data/control input 330), for an input fax via data/control input 330 or video input 310, or for an output fax via data/control output 340 or video display 170. Other functions to be performed by the processor arrangement 360 also include, for example, enabling and disabling the various inputs, such as muting the audio input 320 or the video input 310, enabling and disabling various outputs, such as powering on a video display 170, power level control of the various inputs and outputs, and controlling transmission of commands and control signals to the multimedia access apparatus 110. Other functions of the processor arrangement 360 and, more generally, the multimedia input and control apparatus 300, are also discussed below with reference to FIG. 4.

Figure 4:
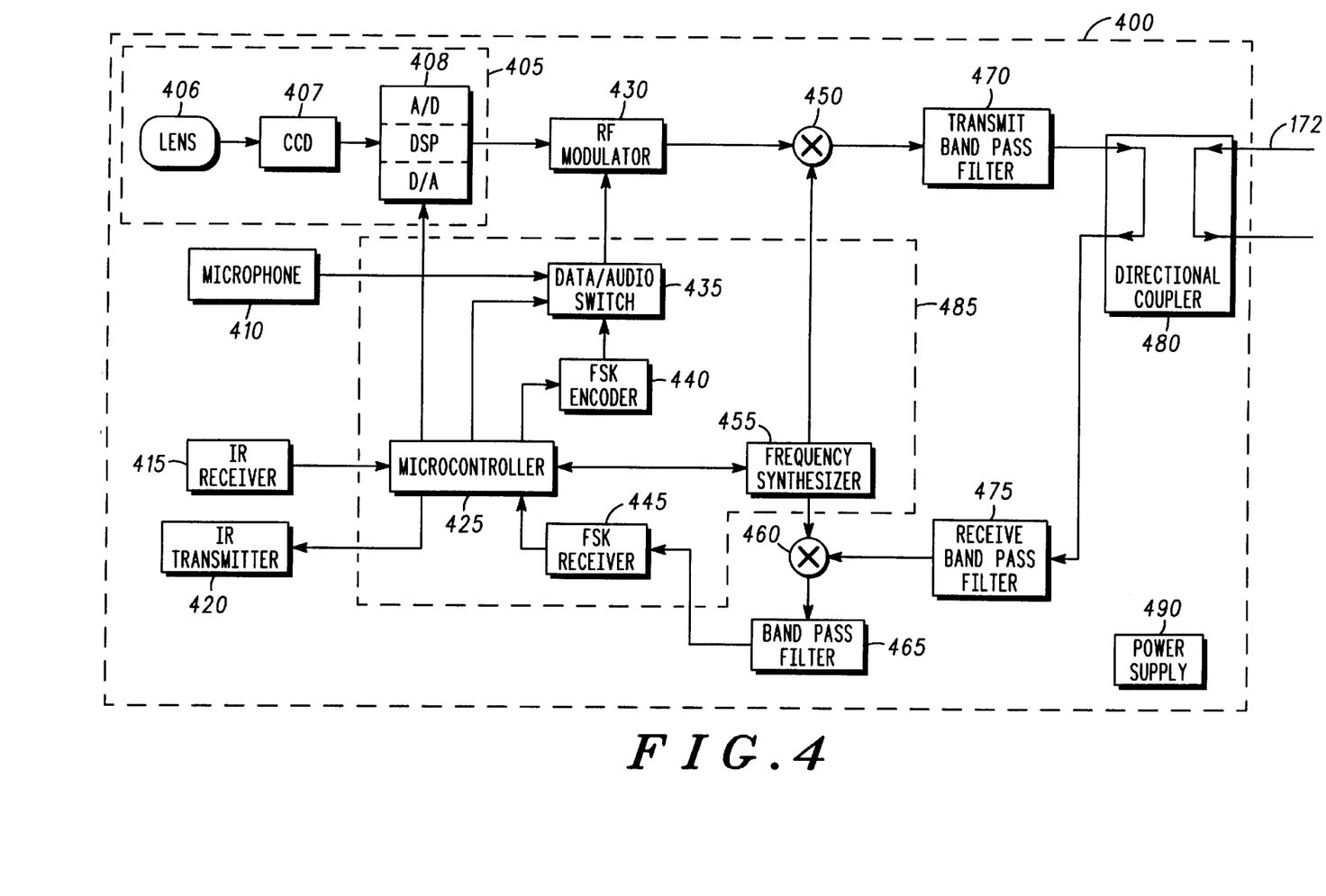
FIG. 4 is a detailed block diagram illustrating a third and preferred embodiment of a multimedia input and control apparatus 400.

FIG. 4 is a detailed block diagram illustrating a third and preferred embodiment of a multimedia input and control apparatus 400. The multimedia input and control apparatus 400 includes a video input 405, a microphone 410 for audio input, an infrared receiver 415 for input of data and control signals, an infrared transmitter 420 for output of data and control signals, a processor arrangement 485 (having a microcontroller 425, FSK encoder 440 and FSK receiver 445, for control of the various inputs and outputs, and frequency synthesizer 455 to provide frequency agility), mixers 450 and 460, and various filters 465, 470 and 475. The multimedia input and control apparatus 400 is coupleable to communications channel 172 via directional coupler 480. The multimedia input and control apparatus 400 may receive DC power directly from the communications channel 172, or may include an optional power supply 490 for connection to AC power lines within the user premises.

As indicated above, the input video function of the multimedia input and control apparatus 400 is unique, among other things, in that the baseband video from the video input is RF modulated up to a carrier frequency above typical CATV downstream services, permitting spectrum sharing with television signals within the same communications channel 172, such as a coaxial cable. Thus, the same cable that delivers television service may be used to carry the input video signal back to the multimedia access apparatus 110. A RF modulator 430 is used along with a frequency offset mixing (frequency synthesizer 455 and mixer 450) to generate the input video transmit carrier. Both baseband video and audio signals are applied to the RF modulator 430, resulting in an NTSC/PAL composite video and audio signal. Rather than using a fixed output frequency for this NTSC/PAL signal, a programmable frequency synthesizer 455 is used to provide frequency agility. This feature accommodates frequency multiplexing of input video signals from multiple multimedia input and control apparatuses 400 or other camera units, where each multimedia input and control apparatus 400 is programmed for a unique carrier frequency. As disclosed in the related applications, using multiple receivers in the multimedia access apparatus 110, multiple simultaneous video signals may be encoded, providing video conferencing from multiple locations and also providing local conferencing of the video signals.

Also in this preferred multimedia input and control apparatus 400 embodiment, an infrared receiver 415 is provided to receive command signals from an IR remote control or infrared wireless keyboard (not illustrated). The received IR data is then used by the microcontroller 425 for control of the multimedia input and control apparatus 400, or is FSK modulated and applied to the audio portion of the NTSC/PAL input video signal (for the return path to the multimedia access apparatus 110). This feature provides a data return path that is independent of the video signal which may be used for control functions for operation of multimedia access apparatus 110 and multimedia input and control apparatus 400, and/or for provisioning of a wireless computer keyboard used in other multimedia applications. While FSK modulation is utilized in the preferred embodiment, those skilled in the art will recognize that myriad other equivalent modulation or encoding methods may be utilized, such as differential quadrature phase shift keying, quadrature phase shift keying, phase shift keying, orthogonal frequency division multiplexing and quadrature amplitude modulation.

Also in this preferred embodiment, an independent RF receive channel (through filters 475 and 465, mixer 460 and FSK receiver 445) is also provided which may be used for video camera control functions, such as pan, tilt, and zoom, as well as a communications path for controlling the transmit carrier frequency of the input NTSC/PAL video signal. This receive channel may also be programmed to operate at a unique carrier frequency to accommodate multiple camera units, and uses FSK modulation for such data transmission.

An infrared transmitter 420 is also provided which may be coupled to the receive data channels (through IR receiver 415 or FSK receiver 445, via microcontroller 425) for control of infrared devices within the user premises or other camera environment, allowing the user or the multimedia access unit 110 to send infrared commands to other devices, by way of the multimedia input and control apparatus 400. For example, when the user initiates a video call using the multimedia input and control apparatus 400 (via IR receiver 415) or using any telephone 185, the multimedia access apparatus 110 will issue a series of IR commands to turn on a connected television, other video display 170 or VCR, and switch to a particular receive channel, without any extra effort by the user. When the call is completed, the multimedia access apparatus 110 will issue a "recall" command to return the television to its last programmed channel, if any, or an "off" command to return the television to a power off state. Also for example, when the user receives a video call, the IR receiver 415 may also be utilized for the multimedia input and control apparatus 400 to go off hook and answer the call, and again, to power on any needed devices (via IR transmitter 420), such as a video display 170 or VCR (as a video answering machine). Using the integrated infrared receiver 415, the user also may program the multimedia input and control apparatus 400 to respond to the required set of commands necessary to switch to the viewing channel without entering any unique manufacturing code (as is currently necessary with prior art "universal" remote products). The multimedia input and control apparatus 400, through the microcontroller 425, will "learn" the required IR command set when the user presses the corresponding buttons on the IR remote control. The multimedia access apparatus 110 also will display prompting information (on video displays 170) to assist the user through the programming sequence. Thus, with this infrared interface, total automatic operation of the multimedia input and control apparatus 400 and the multimedia access apparatus 110 is achieved. Such total automatic operation may also be extended to control other potentially IR controllable devices, such as stereos, other multimedia equipment, lighting, security, and HVAC, such that a command or control signal from the multimedia access apparatus 110 may be broadcast to such devices via such an IR interface.

Referring to FIG. 4, the video input 405 (such as a Philips VCM41) of the multimedia input and control apparatus 400 includes a lens 406 for video capture and optical spatial reduction, to focus an image on a charge coupled device (CCD) 407; the CCD 407, which performs photoelectric translation and converts the optical image to an electronic (pixel) array; and a digital signal processor (DSP) 408 (including analog to digital (A/D) and digital to analog (D/A) conversion functions), in which analog information from the CCD 407 is converted to a digital, YUV formatted video signal (in which Y is a luminance component and U and V are chrominance components), which in turn is D/A converted to form a baseband NTSC/PAL composite (analog) video signal). All input video functions can be preset or adjusted (through microcontroller 425) by the user, including electronic iris, lens iris, white balance, V-phase, linelock, AGC, contour and hue (NTSC only).

The baseband NTSC/PAL composite video signal from the video input 405 is passed to RF modulator 430, such as a Motorola MC1374, in which the video signal may be combined with an audio signal from a microphone 410 or with data from the FSK encoder 440. The RF modulator 430 typically includes an FM audio modulator, sound carrier oscillator and RF oscillator, and is designed to generate a TV signal from audio and video inputs. The video input is from the video input 405, and the audio input is from one of two sources, the microphone 410 or FSK encoder 440 (using FSK data modulation), using a data/audio switch (within or under the control of microcontroller 425) to select the audio modulation source. The RF output of the RF modulator 430 may be designed for operation on a selected RF carrier, such channel 3 (61.25 MHz) with the appropriate offset carrier frequency (4.5 MHz) for audio.

The output of the RF modulator 430 is applied to a mixing circuit (mixer 450 and frequency synthesizer 455) which provides a frequency shift operation up to the final transmit carrier frequency. The output frequency is controlled by the local oscillator or frequency synthesizer 455 which, when applied to the mixer 450, results in both the sum and difference products of the output carrier. The sum product is retained (and the difference product removed) by passing the mixer output through a band-pass filter 470 having bandwidth adequate to support the desired number of NTSC/PAL channels (each 6 MHz wide). The synthesizer frequency is controlled by the microcontroller 425. A nominal center frequency of, for example, 1.1 GHz, for the filter 470 is well above any CATV signals that may reside within the same distribution cable, such as communications channel 172. The final RF input video signal (to be input to the multimedia access apparatus 110) is applied to a directional coupler 480, which injects the signal into the communications channel 172.

Continuing to refer to FIG. 4, the microcontroller 425 preferably consists of a single-chip microcontroller with an external oscillator, such as the Motorola MC6805 family. Functions provided by the microcontroller 425 include FSK timing recovery and data frame decoding, FSK frame generation and FSK tone generation, input video (camera) control functions, frequency synthesizer 455 control functions, and IF receiver template recording for learning received IR commands.

As mentioned above, the audio input into the RF modulator 430 may come from one of two sources; the microphone 410 or an FSK encoder 440. Wideband FM is used on the audio subcarrier of the NTSC/PAL signal, allowing up to 25 kHz of frequency deviation. The binary FSK baud rate FSK encoder 440 is selected to operate within this range at a rate of 16 kbaud in the preferred embodiment. Data from the microcontroller 425 entered, for example, through a wireless keyboard or IR remote control via the IR receiver 415, may provide a reverse data rate up to 16 kbps to the multimedia access apparatus 110. The FSK modulation occurs in the microcontroller 425 and FSK encoder 440, which generates the two tones required for binary FSK generation. The FSK data originates from the infrared receiver 415, and is applied to the microcontroller 425, FSK encoder 440, and applied to the data/audio switch 435 for subsequent RF modulation in RF modulator 430.

The infrared receiver 415, such as a Motorola MC3373, is an IR remote control amplifier/detector circuit providing high gain and pulse shaping to couple the signal from an IR receiver diode to the microcontroller 425. An envelope detector function detects IR energy received at the diode and applies a large amount of gain to generate a digital output signal. The output signal is received at the microcontroller 425, in which timing is established and FSK modulation is performed (with FSK encoder 440). As a consequence, a received IR signal will result in FSK modulated data being applied to the RF modulator 430.

An FSK modulated carrier may also be received from the multimedia access apparatus 110 by way of the directional coupler 480 attached to the communications channel 172. The RF carrier frequency preferably is located above the CATV band and the RF input video signal modulated (by modulator 430) as discussed above, such as at 1.3 GHz. The signal is bandpass filtered in filter 475 to reject noise and other signals present in the communications channel 172, and is applied to a mixing circuit (mixer 460 and frequency synthesizer 455), which shifts the carrier frequency down to an intermediate frequency (IF), such as 10.7 MHz. A local oscillator or frequency synthesizer 455 is used with the mixer 460 to generate both sum and difference products of the received carrier. The difference products are retained (sum products removed) by the IF bandpass filter 465 (e.g., centered at 10.7 MHz), and the resulting signal is then applied to the FSK receiver 445. The FSK receiver 445, such as a Motorola MC3356, is a wideband FSK receiver including an oscillator (IF), mixer, limiting IF amplifier, quadrature detector, audio buffer, squelch, and data shaping comparator, and accommodates data rates up to 500 kbps. The output of this FSK receiver 445 is binary data which is then applied to the microcontroller 425.

The microcontroller 425 establishes timing for the received data and decodes the data into command/data frames. The command/data frames are then used for various functions within the multimedia input and control apparatus 400. For example, a typical control/data frame may program the transmit frequency for the input video signal, addressing the frequency synthesizer 455, and the data would contain the desired frequency programming information. Another control/data frame is used to program features within the video input 405, such as pan, tilt, and zoom. In addition, the command/data frames may be applied to the IR transmitter 420 to send an infrared signal out of the multimedia input and control apparatus 400, for example, to a video display 170. The IR transmitter 420, such as a Motorola MC44107, converts an input signal from the microcontroller into a pulse code modulated signal suitable for infrared transmission to an appropriate receiver (such as the user's television set). In the preferred embodiment, the IR transmitter 420 accepts a 9-bit binary coded PCM data word from the microcontroller 425, providing up to 512 possible commands.

Correspondingly, the multimedia access apparatus 110 also includes means for FSK detection and FSK transmission in the preferred audio portion of the NTSC/PAL composite video signal. Preferably, for FSK transmission of commands and other control signals to the multimedia input and control apparatus 400, the RF modulator 150 of the multimedia access apparatus 110 also includes a FSK encoder, which may be in the form of a voltage controlled oscillator, which generates a FSK modulated IF signal from binary data provided by the processor arrangement 143. The FSK encoded signal, in turn, is applied to a mixer (and possibly combined with an output video signal) to generate a radio frequency output video signal (containing FSK modulated data in the audio portion), such as an output video signal at 1.3 GHz. Correspondingly, for reception of FSK data from the multimedia input and control apparatus 400, the RF demodulator 155 of the multimedia access apparatus 110 would also include a FSK detector, which decodes the FSK modulated audio portion of the input video signal and provides binary data to the processor arrangement 143.

Figure 5:
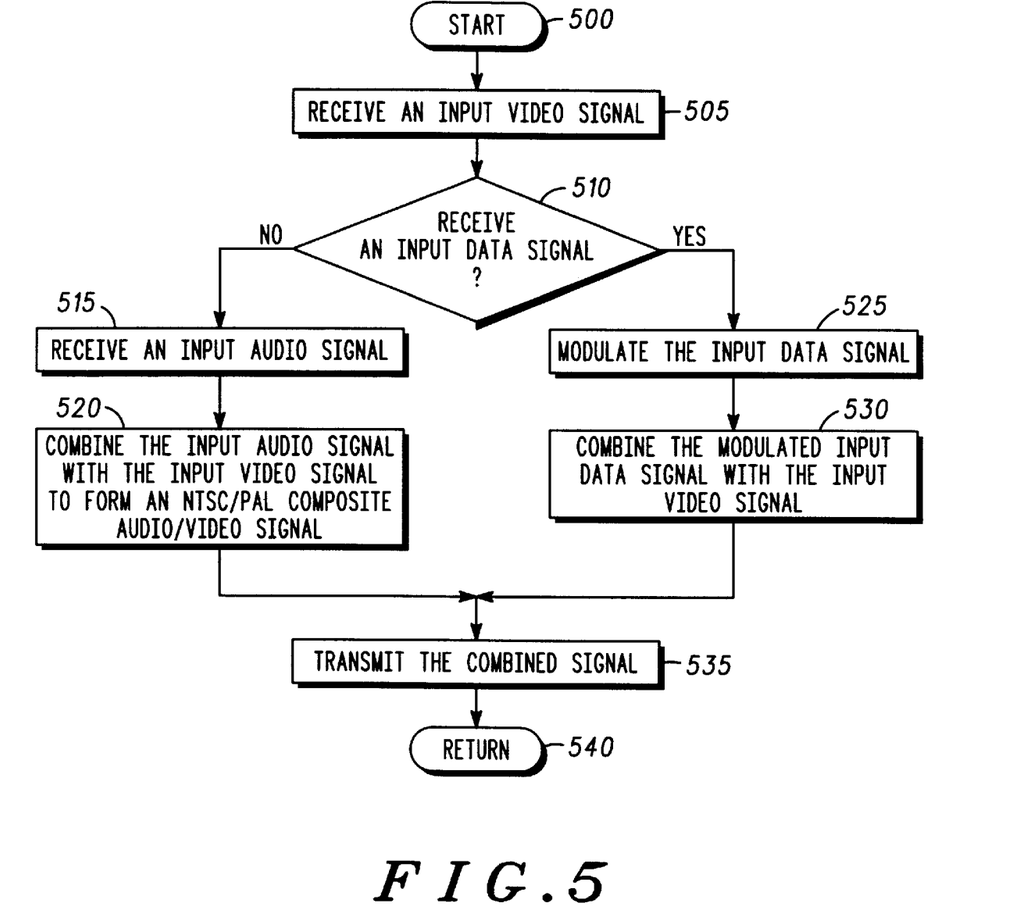
FIG. 5 is a flow diagram illustrating a method for multimedia input and control in accordance with the present invention.

FIG. 5 is a flow diagram illustrating a method for multimedia input and control in accordance with the present invention. Beginning with start step 500, an input video signal is received, step 505, such as through video input 310 or video input 405. Next, the method determines whether an input data signal is being received, step 510, such as whether a command or other data signal is being received through data/control input 330 or IR receiver 415. When an input data signal is not being received in step 510, then an input audio signal may be received, step 515. Next, in step 520, the input audio signal is combined with the input video signal, for example, in RF modulator 350 or 430, to form a combined audio/video signal, such as an NTSC/PAL composite audio/video signal. Conversely, when an input data signal is being received in step 510, then the input data signal is modulated, step 525, such as FSK modulation utilizing FSK encoder 440. As part of step 525, depending upon the implementation, input audio may also be muted, such as through data/audio switch 435. The modulated input data signal is then combined with the input video signal (inserting the modulated data signal into the portion or bandwidth of the composite video signal otherwise reserved for audio) to form a combined video/data signal, step 530. Next, following step 530 or step 520, the combined signal is transmitted, step 535, such as transmitting either the composite audio/video signal or the combined video/data signal, and the method may end, return step 540. Not separately illustrated in FIG. 5, this process may be repeated. In addition, the data and voice paths may be alternated, resulting in dynamic interleaving of voice and data in the combined signal.

In summary, FIGS. 3–5 disclose an apparatus (300, 400) for multimedia input and control, in which the apparatus comprises: first, a video input 310 to produce an input video signal; second, an audio input 320 to produce an input audio signal; third, a radio frequency modulator 350 coupled to the video input 310 and the audio input 320; fourth, a data/control input 330 to produce an input data signal; and fifth, a processor arrangement 360 coupled to the video input 310, to the audio input 320, to the radio frequency modulator 350, and to the data/control input 330. As discussed above, the processor arrangement 360 is responsive when operably coupled, through a set of program instructions, to produce a first processor signal (such as a switching signal controlling the data/audio switch 435) to the radio frequency modulator 350 to combine the input video signal with the input audio signal to form a composite audio/video signal, and the processor arrangement further responsive to modulate the input data signal to form a modulated input data signal and produce a second processor signal to the radio frequency modulator to combine the input video signal with the modulated input data signal to form a combined video/data signal. The various first and second processor signals may be switching signals (such as a switching signal controlling the data/audio switch 435), muting signals (such as muting audio input), or routing signals (such as routing FSK modulated data rather than input audio to the RF modulator). In addition, the apparatus 300 may also include a data/control output coupled to the processor arrangement, the data/control output to produce an output data signal, such as a video display power on signal, a video display channel selection signal, or a video display volume control signal.

Also in summary, the apparatus 300 includes command and control functionality, such as frequency agility, wherein the processor arrangement 360 is responsive to adjust a transmit frequency of the radio frequency modulator in response to a first control signal of a plurality of control signals; for power level adjustment, wherein the processor arrangement 360 is responsive to adjust a transmit power level of the radio frequency modulator in response to a second control signal of the plurality of control signals; and for signaling, such as wherein the processor arrangement is responsive to produce an off hook signal in response to a third control signal of the plurality of control signals.

As may be apparent from the above discussion, the apparatus and method of the present invention provides significant advantages. First, the various embodiments of the multimedia input and control apparatus 300 and 400 provide for a bi-directionality of control, with the multimedia input and control apparatuses able to receive commands and control signals from the multimedia access apparatus 110 (and also via the data/control input 330 and IR receiver 415), and able to transmit commands and control signals to the multimedia access apparatus 110.

Another significant feature of the present invention is the unique use of the audio subcarrier signal of a NTSC/PAL composite audio/video signal, not only for the ordinary audio portion of a video conference call, but also for the transmission of input data within the same bandwidth otherwise reserved for audio. Not only does this provide for an efficient use (and re-use) of available bandwidth, it also allows for use of a single RF modulator in the apparatus embodiments.

Yet other significant advantages of the present invention are frequency agility and dynamically variable transmit power levels, utilizing the control or command signaling methodology of the present invention. Such agility increases overall performance by avoiding interference with the other audio/video signals on the communications channel which are to be multiplexed subsequently by the multimedia access apparatus, and also allows moving to frequencies or channels having less noise, less interference, and overall higher channel quality.

Lastly, another significant advantage of the present invention is the distributed input-output functionality provided by the various apparatus embodiments. This distributed I/O functionality also enables other significant features, such as automatic answering of video conferencing calls (through control signals transmitted through data/control outputs such as an IR transmitter), including automatically going off hook, answering the call, tuning the video display to the correct receive channel, and adjusting the audio volume.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus for multimedia input and control, the apparatus comprising:

a video input to produce an input video signal;

an audio input to produce an input audio signal;

a radio frequency modulator coupled to the video input and the audio input;

a data/control input to produce an input data signal; and a processor arrangement coupled to the video input, to the audio input, to the radio frequency modulator, and to the data/control input, the processor arrangement responsive when operably coupled, through a set of program instructions, to produce a first processor signal to the radio frequency modulator to combine the input video signal with the input audio signal to form a composite audio/video signal, the processor arrangement further responsive to modulate the input data signal to form a modulated input data signal and produce a second processor signal to the radio frequency modulator to combine the input video signal with the modulated input data signal to form a combined video/data signal.

2. The apparatus of claim 1, further comprising a data/control output coupled to the processor arrangement, the data/control output to produce an output data signal.

3. The apparatus of claim 2 wherein the data/control output is an infrared transmitter.

4. The apparatus of claim 2 wherein the output data signal is a video display power on signal.

5. The apparatus of claim 2 wherein the output data signal is a video display power off signal.

6. The apparatus of claim 2 wherein the output data signal is a command signal to an infrared controllable device.

7. The apparatus of claim 2 wherein the output data signal is a video display channel selection signal.

8. The apparatus of claim 2 wherein the output data signal is a video display volume control signal.

9. The apparatus of claim 1 wherein the processor arrangement is further responsive to a plurality of control signals.

10. The apparatus of claim 9 wherein the processor arrangement is responsive to adjust a transmit frequency of the radio frequency modulator in response to a first control signal of the plurality of control signals.

11. The apparatus of claim 9 wherein the processor arrangement is responsive to adjust a transmit power level of the radio frequency modulator in response to a second control signal of the plurality of control signals.

12. The apparatus of claim 9 wherein the processor arrangement is responsive to produce an off hook signal in response to a third control signal of the plurality of control signals.

13. The apparatus of claim 1 wherein the video input is a video camera.

14. The apparatus of claim 1 wherein the audio input is a microphone.

15. The apparatus of claim 1 wherein the data control input is an infrared receiver.

16. The apparatus of claim 1 wherein the input data signal is FSK modulated.

17. The apparatus of claim 1 wherein the modulated input data signal is inserted into an audio subcarrier portion of the input video signal to form the combined video/data signal.

18. The apparatus of claim 1 wherein the processor arrangement is further responsive to mute the input audio signal in the presence of the input data signal.

19. The apparatus of claim 1 wherein the processor arrangement further comprises:

an FSK encoder;

an FSK receiver;

a frequency synthesizer; and a microcontroller coupled to the FSK encoder, to the FSK receiver, and to the frequency synthesizer.

20. A method for multimedia input and control, the method comprising:

(a) receiving an input video signal;

(b) receiving an input audio signal;

(c) when an input data signal is received, modulating the input data signal to form a modulated input data signal and combining the modulated input data signal with the input video signal to form a combined video/data signal; and (d) when an input data signal is not received, combining the input audio signal with the input video signal to form a composite audio/video signal.

21. The method of claim 20, further comprising:

adjusting a transmit frequency in response to a first control signal of a plurality of control signals.

22. The method of claim 20, further comprising:

adjusting a transmit power level in response to a second control signal of a plurality of control signals.

23. The method of claim 20 wherein the input data signal is FSK modulated.

24. The method of claim 20 wherein step (c) further comprises inserting the modulated data input signal into an audio subcarrier portion of the input video signal to form the combined video/data signal.

25. The method of claim 20, further comprising:

muting the input audio signal in the presence of the input data signal.

26. The method of claim 20, further comprising:

generating an output data signal.

27. The method of claim 26 wherein the output data signal is a video display power on signal.

28. The method of claim 26 wherein the output data signal is a video display power off signal.

29. The method of claim 26 wherein the output data signal is a video display channel selection signal.

30. The method of claim 26 wherein the output data signal is a video display volume control signal.

31. The method of claim 20, wherein steps (c) and (d) are alternatingly performed to form a combined video signal having interleaved audio and data.

32. An apparatus for multimedia input and control, the apparatus comprising:

a video camera to produce an input video signal;

a microphone to produce an input audio signal;

a radio frequency modulator coupled to the video camera and the microphone;

an infrared receiver to produce an input data signal;

an infrared transmitter to produce an output data signal; and a processor arrangement coupled to the video camera, to the microphone, to the radio frequency modulator, to the infrared receiver and to the infrared transmitter, the processor arrangement responsive when operably coupled, through a set of program instructions, to produce a first processor signal to the radio frequency modulator to combine the input video signal with the input audio signal to form a composite audio/video signal, the processor arrangement further responsive to FSK modulate the input data signal to form an FSK modulated input data signal and produce a second processor signal to the radio frequency modulator to insert the FSK modulated input data signal into an audio subcarrier portion of the input video signal to form a combined video/data signal.

33. The apparatus of claim 32 wherein the processor arrangement is responsive to adjust a transmit frequency of the radio frequency modulator in response to a first control signal of the plurality of control signals.

34. The apparatus of claim 32 wherein the processor arrangement is responsive to adjust a transmit power level of the radio frequency modulator in response to a second control signal of the plurality of control signals.

35. The apparatus of claim 32 wherein the processor arrangement is responsive to produce an off hook signal in response to a third control signal of the plurality of control signals.

36. The apparatus of claim 32 wherein the output data signal is a video display power on signal.

37. The apparatus of claim 32 wherein the output data signal is a video display power off signal.

38. The apparatus of claim 32 wherein the output data signal is a video display channel selection signal.

39. The apparatus of claim 32 wherein the output data signal is a video display volume control signal.

* * * * *